United States Patent
Zhang et al.

(10) Patent No.: US 12,167,363 B2
(45) Date of Patent: Dec. 10, 2024

(54) METHOD AND DEVICE FOR ELIMINATING NON-LINE OF SIGHT ERRORS OF TIME OF ARRIVAL MEASUREMENT VALUES, AND TERMINAL

(71) Applicant: DATANG MOBILE COMMUNICATIONS EQUIPMENT CO., LTD., Beijing (CN)

(72) Inventors: Zhenyu Zhang, Beijing (CN); Bin Ren, Beijing (CN); Ren Da, Beijing (CN); Gang Li, Beijing (CN); Dafei Yu, Beijing (CN); Zhanqi Zheng, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 329 days.

(21) Appl. No.: 17/793,923

(22) PCT Filed: Dec. 15, 2020

(86) PCT No.: PCT/CN2020/136564
§ 371 (c)(1),
(2) Date: Jul. 19, 2022

(87) PCT Pub. No.: WO2021/155714
PCT Pub. Date: Aug. 12, 2021

(65) Prior Publication Data
US 2023/0046671 A1   Feb. 16, 2023

(30) Foreign Application Priority Data

Feb. 5, 2020 (CN) .......................... 202010080737.4

(51) Int. Cl.
*H04W 64/00* (2009.01)
*G01S 5/06* (2006.01)

(52) U.S. Cl.
CPC ............... *H04W 64/00* (2013.01); *G01S 5/06* (2013.01)

(58) Field of Classification Search
CPC ................................ H04W 64/00; G01S 5/06
See application file for complete search history.

(56) References Cited

U.S. PATENT DOCUMENTS

| 9,578,464 B2 * | 2/2017 | Bengtsson | ............ G01S 5/0273 |
| 11,350,293 B2 * | 5/2022 | Tadayon | ............... H04W 16/24 |

(Continued)

FOREIGN PATENT DOCUMENTS

| CN | 1499877 A | 5/2004 |
| CN | 101202585 A | 6/2008 |

(Continued)

OTHER PUBLICATIONS

Yin Xueqiang, "Design of CSS-based wireless positioning system and analysis of NLOS suppression algorithm", Modern Electronics Technique, vol. 39, No. 7, total 5 pages, Apr. 2016.

(Continued)

*Primary Examiner* — Adam D Houston
(74) *Attorney, Agent, or Firm* — Kilpatrick Townsend & Stockton LLP

(57) ABSTRACT

Disclosed in the embodiments of the present application are a method and a device for eliminating non-line of sight (NLOS) in time of arrival (TOA) measurement values, and a terminal. The method includes: modeling a probability density of the first TOA measurement values from each base station to a terminal into a Gaussian mixture model, and selecting the TOA measurement values modeled into the Gaussian mixture model; performing NLOS identification (Continued)

Modeling a probability density of the TOA measurement values from each base station to a terminal into a Gaussian mixture model, and selecting the TOA measurement values modeled into the Gaussian mixture model — S101

Performing NLOS identification on selected TOA measurement values to obtain an identification label, the identification label is used for indicating whether the selected TOA measurement values correspond to NLOS — S102

Correcting the selected TOA measurement values according to the identification label to eliminate the NLOS errors of the selected TOA measurement values — S103 on the selected TOA measurement values to obtain an identification label; and the identification label is used to indicate whether the selected TOA measurement values correspond to NLOS; and correcting the selected TOA measurement values according to the identification label, to eliminate errors caused by NLOS in the selected TOA measurement values.

17 Claims, 5 Drawing Sheets

(56) References Cited

U.S. PATENT DOCUMENTS

| | | | |
|---|---|---|---|
| 2008/0032709 A1* | 2/2008 | Guvenc | G01S 5/14 455/456.2 |
| 2016/0327628 A1 | 11/2016 | Perez-Cruz et al. | |
| 2019/0357258 A1 | 11/2019 | Hwang | |
| 2024/0236743 A1* | 7/2024 | Yerramalli | H04L 5/0051 |

FOREIGN PATENT DOCUMENTS

| | | | | |
|---|---|---|---|---|
| CN | 101282577 A | | 10/2008 | |
| CN | 101466145 A | | 6/2009 | |
| CN | 102547827 A | | 7/2012 | |
| CN | 102088769 B | * | 3/2014 | |
| CN | 104093207 A | | 10/2014 | |
| CN | 105898865 A | * | 8/2016 | G01S 5/02 |
| CN | 106102161 A | | 11/2016 | |
| CN | 106686718 A | * | 5/2017 | |
| CN | 107241797 A | * | 10/2017 | G01S 5/0257 |
| CN | 108337197 A | | 7/2018 | |
| CN | 109752690 A | * | 5/2019 | |
| CN | 110596641 A | | 12/2019 | |
| CN | 113225667 A | * | 8/2021 | G01S 5/02 |
| CN | 116097116 A | * | 5/2023 | G01S 5/0036 |
| CN | 116819435 A | * | 9/2023 | |
| CN | 117420498 A | * | 1/2024 | |
| CN | 117518076 A | * | 2/2024 | |
| CN | 118075868 A | * | 5/2024 | |
| CN | 118368632 A | * | 7/2024 | |
| KR | 102659273 B1 | * | 4/2024 | |
| WO | WO-2008017033 A2 | * | 2/2008 | G01S 5/0215 |
| WO | WO-2008017034 A2 | * | 2/2008 | G01S 5/0215 |
| WO | WO-2021155714 A1 | * | 8/2021 | G01S 5/02 |
| WO | WO-2024076855 A1 | * | 4/2024 | G01S 5/0218 |

OTHER PUBLICATIONS

Toshihiro Mogi et al.,"TOA Localization using RSS Weight with Path Loss Exponents Estimation in NLOS Environments", 2008 14th Asia-Pacific Conference on Communications, total 5 pages, Feb. 2009.

Ericsson,"Evaluations of Richer UE feedback for OTDOA", 3GPP TSG RAN WG1 Meeting #82, Beijing, China, Aug. 24-28, 2015, total 7 pages, R1-154763.

Qualcomm Incorporated,"Mitigating Movement of a UE during Positioning using IMUs", 3GPP TSG-RAN WG1 Meeting #90bis, Prague, CZ, Oct. 9-13, 2017, total 17 pages, R1-1718160.

* cited by examiner

METHOD AND DEVICE FOR ELIMINATING NON-LINE OF SIGHT ERRORS OF TIME OF ARRIVAL MEASUREMENT VALUES, AND TERMINAL

CROSS-REFERENCE TO RELATED APPLICATIONS

The present application is a US National Stage of International Application No. PCT/CN2020/136564, filed on Dec. 15, 2020, which claims priority to Chinese Application No. 202010080737.4 filed on Feb. 5, 2020, entitled "Method and Device for Eliminating Non-line of Sight (NLOS) errors of Time of Arrival Measurement Values, and Terminal", which are hereby incorporated by reference in their entireties.

FIELD

The present application relates to the field of communication, and in particular, to a method and a device for eliminating non-line of sight (NLOS) errors of time of arrival (TOA) measurement values and a terminal.

BACKGROUND

Wireless cellular network positioning can be considered as a process in which a base station (or a receiver end) receives radio waves travelling between the base station and the receiver, and determines the location of the receiver according to the characteristics of the radio waves. In mobile communication positioning, errors that affect the positioning accuracy are mainly divided into two kinds. The error of first kind is measurement error caused by the design of the receiver due to thermal noise at the receiver end. Its statistical characteristic is Gaussian white noise, which is unavoidable in practical operation, and has limited influence on positioning accuracy. The error of second kind is caused by the severe destruction of radio wave characteristics. Taking time of arrival (TOA) measurement as an example, TOA measurement values obtained by the receiver are inaccurate due to multipath and NLOS propagation. In this case, common positioning algorithms will have a large positioning deviation, which will even lead to inability to locate. In the practical communication environment, such errors caused by the channel environment cannot be avoided, and these errors will greatly affect the positioning accuracy. Therefore, how to mitigate the influence caused by the channel in a complex wireless communication environment is the key problem in the research on wireless positioning algorithms.

Referring how to mitigate the positioning error caused by NLOS, there are two ways to suppress the NLOS errors. One way is to make all TOA values obtained by the receiver be line of sight (LOS) using an algorithm, and then determine the UE's location through positioning algorithms, so as to obtain an accurate mobile station location. However, on the receiver side, it is difficult to determine a LOS path or a NLOS path without other prior knowledge. For complex time-varying channel conditions, it is often difficult to perform effective TOA measurement identification in real time even with prior knowledge of the channel. Another way is to identify or correct, by the base station (or receiver), NLOS through improved positioning algorithms. That is, the TOA measurement values received by the base station (or receiver) are in the case where the LOS path and the NLOS path are in aliasing. Taking six base stations and a single user as an example, that is, there are six TOA measurement values. A possible situation is that there are three TOA measurement values corresponding to the LOS path, and three TOA measurement values corresponding to the NLOS path. In the above situation, how to identify the NLOS paths, discard the NLOS measurement results, or further correct the identified NLOS results is the key problem in the research on wireless communication positioning.

For identifying NLOS, the measurement results of a single TOA cannot be further analyzed, and it is necessary to range an object multiple times within a period of time. There are two main ways: the first way is non-Bayesian detection, in which NLOS is identified using the characteristics of the result distribution by analyzing the results of multiple TOA measurements in the case of LOS/NLOS prior probability position. For example, the variance of the TOA measurement values in NLOS paths is often larger than that of the TOA measurement values in LOS paths, and this information is used for NLOS identification. Then, it can be seen from the above description that the TOA measurement values corresponding to the LOS are Gaussian distributed. Therefore, NLOS propagation can be identified by checking whether the measurement values are Gaussian distributed when the prior probabilities of LOS/NLOS propagation are unknown. In recent years, test methods such as K-S, A-D, Chi-Square, Gross test, skewness and kurtosis test have appeared successively. The second way is Bayesian detection using the prior probabilities of LOS/NLOS propagation in which, the LOS/NLOS propagation paths can be identified by methods such as generalized likelihood ratio test according to the different probability statistics distributions of its errors. All of the above methods require certain prior information known in advance, such as the prior probabilities of LOS/NLOS propagation, the statistical characteristics of NLOS errors, and the predetermined false alarm probabilities. However, such information is often very different in different practical positioning scenarios, and it is often impossible to know without practical measurement in advance, so the scope of above methods is limited.

No matter which one of the above methods is used, for NLOS identification, it takes a period of time to perform multiple range measurements on a target. Due to the time-varying characteristics of the channel, the TOA results of multiple measurements are difficult to follow a specific distribution assumption. Even TOA measurement values in the LOS path do not obey to the Gaussian distribution in the long-term measurement. In addition, the prior probabilities of LOS/NLOS propagation are also difficult to be known in advance in the practical situation, which makes it difficult to eliminate the NLOS errors of TOA measurement values.

SUMMARY

Due to the above problems in the traditional methods, the embodiments of the present application provides a method and a device for eliminating non-line of sight (NLOS) errors of time of arrival (TOA) measurement values, and a terminal.

According to an embodiment of the present application, provided is a method for eliminating NLOS errors of the TOA measurement values, including:
  modeling a probability density of the TOA measurement values from each base station to a terminal into a Gaussian mixture model, and selecting TOA measurement values modeled into the Gaussian mixture model;
  performing NLOS identification on selected TOA measurement values to obtain an identification label, the identification label is used for indicating whether the selected TOA measurement values correspond to NLOS; and correcting the selected TOA measurement values according to the identification label, to eliminate NLOS errors of the selected TOA measurement values.

According to an embodiment of the present application, further provided is a device for eliminating non-line of sight (NLOS) in time of arrival (TOA) measurement values, including:

a measurement value modeling device, configured to model the probability density of the TOA measurement values from each base station to a terminal into a Gaussian mixture model, and screen the TOA measurement values modeled into the Gaussian mixture model;

a NLOS identifying device, configured to perform NLOS identification on a selected TOA measurement value to obtain an identification label, the identification label is used for indicating whether the selected TOA measurement values correspond to NLOS; and a measurement value correcting device, configured to correct the selected TOA measurement values according to the identification label to eliminate NLOS errors of the selected TOA measurement values.

According to an embodiment of the present application further provided is a terminal, including:

at least one processor; and at least one memory communicatively connected to the processor, where:

the memory having stored thereon program instructions executable by the processor, and the processor invokes the program instructions to execute the following steps:

modeling the probability density of time of arrival (TOA) measurement values from each base station to a terminal into a Gaussian mixture model, and selecting the TOA measurement values modeled into the Gaussian mixture model;

performing non-line of sight (NLOS) identification on selected TOA measurement values to obtain an identification label, the identification label is used for indicating whether the selected TOA measurement values correspond to NLOS; and correcting the selected TOA measurement values according to the identification label, to eliminate NLOS error of the selected TOA measurement value.

According to an embodiment of the present application, further provided is a non-transitory computer-readable storage medium, where the non-transitory computer-readable storage medium stores a computer program, and the computer program causes the computer to execute the following steps:

modeling the probability density of time of arrival (TOA) measurement values from each base station to a terminal into a Gaussian mixture model, and selecting the TOA measurement values modeled into the Gaussian mixture model;

performing non-line of sight (NLOS) identification on selected TOA measurement values to obtain an identification label, the identification label is used for indicating whether the selected TOA measurement values correspond to NLOS;

correcting the selected TOA measurement values according to the identification label, to eliminate NLOS errors of the selected TOA measurement values.

In the embodiment of the present application, by modeling the probability density of each TOA measurement value into a Gaussian mixture model and selecting the TOA measurement values, it is ensured that the TOA measurement values corresponding to the LOS are accurately found in the case that LOS and NLOS are in aliasing; meanwhile, errors caused by NLOS in the selected TOA measurement values (i.e., NLOS errors of the selected TOA measurement values) are eliminated by correcting the selected TOA measurement values, which improves the positioning accuracy of the user.

BRIEF DESCRIPTION OF THE DRAWINGS

In order to more clearly illustrate the solutions of the embodiments of the present application or the prior art, the following will briefly introduce the accompanying drawings used in describing the embodiments. The accompanying drawings in the following description are only some embodiments of the present application, and other drawings can also be obtained based on these drawings.

DETAILED DESCRIPTION

The embodiments of the present application will be further described below with reference to the accompanying drawings. The following embodiments are only used to more clearly illustrate the solutions of the present application, and cannot be used to limit the protection scope of the present application.

Figure 1:
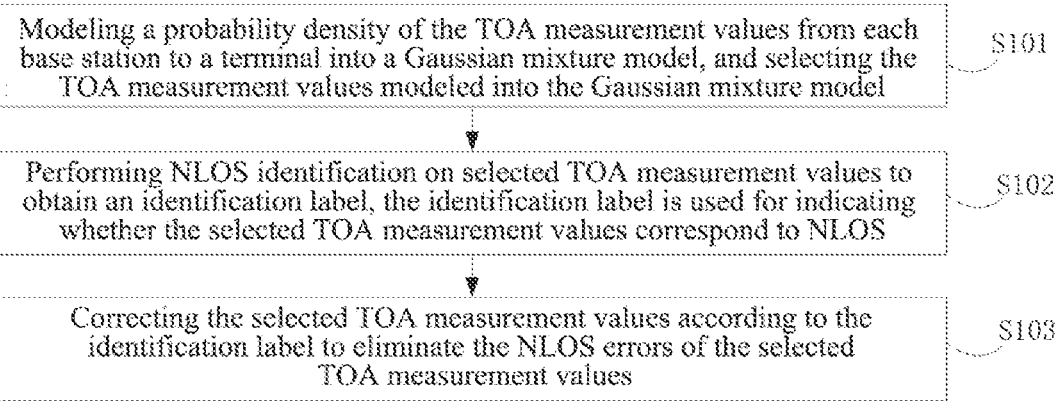
FIG. 1 is a schematic flowchart of a method for eliminating non-line of sight errors of time of arrival measurement values according to an embodiment of the present application.

FIG. 1 shows a schematic flowchart of a method for eliminating non-line of sight errors of time of arrival (TOA) measurement values according to an embodiment, including:

S101: modeling the probability density of the TOA measurement values from each base station to a terminal into a Gaussian mixture model, and selecting the TOA measurement values modeled into the Gaussian mixture model, where the TOA is a time when downlink positioning reference signal (PRS) from a base station reaches the UE, which is obtained by the UE performing a downlink-PRS measurement.

The probability density of TOA measurement values is a probability density distribution obtained by taking multiple TOA measurement values as random variables through statistical analysis, and the TOA measurement value is modeled as a random variable obeying Gaussian mixture.

Gaussian mixture modeling is a process of establishing a Gaussian mixture model; where the Gaussian mixture model is used for accurately quantifying things with a Gaussian probability density distribution (normal distribution curve) and is a model that decomposes things into several models based on the Gaussian probability density distribution.

Specifically, in order to improve the efficiency of subsequent processing, it is necessary to screen the TOA measurement values modeled into the Gaussian mixture model to remove the useless TOA measurement values since there are some useless TOA measurement values among obtained respective TOA measurement values.

S102: performing NLOS identification on the selected TOA measurement values, so as to obtain identification labels.

The identification labels are used for indicating whether the selected TOA measurement values correspond to NLOS.

Specifically, the selected TOA measurement values are identified according to identification methods such as standard deviation-based identification method, skewness and kurtosis-based identification method, and the TOA measurement values with NLOS errors are determined.

S103: correcting the selected TOA measurement values according to the identification label, to eliminate NLOS errors of the selected TOA measurement values.

Specifically, the TOA measurement values carrying the identification label are corrected to obtain the TOA measurement values without the NLOS errors. More accurate user location results can be obtained by performing positioning processing on the TOA measurement values without the NLOS errors.

In the present embodiment, by modeling the probability density of TOA measurement values into a Gaussian mixture model and selecting, it is ensured that TOA measurement values corresponding to the LOS path are accurately found in the case that LOS and NLOS are in aliasing; meanwhile, the NLOS errors of the selected TOA measurement values are eliminated by correcting the selected TOA measurement values, which improves the positioning accuracy of the user.

Further, on the basis of the above method embodiments, in S101, modeling the probability density of the TOA measurement values from each base station to a terminal into a Gaussian mixture model, specifically includes:

modeling a probability density of first TOA measurement values into a Gaussian mixture model to obtain second TOA measurement values represented by the Gaussian mixture model, where the first TOA measurement values measured by the UE are the TOA measurement values from each base station to the UE and the second TOA measurement values are obtained by modeling the probability density of the first TOA measurement values into a Gaussian mixture model.

A number of change of channel is a number of times that the additive bias greater than zero varies with the change of channel.

Before S101, the method further includes:
receiving the PRS configuration information sent by respective base stations, and performing downlink PRS measurement according to respective PRS configuration information to obtain the TOA measurement values from each base station to the UE, where the PRS configuration information is configuration information of the PRS sent by the base stations to the UE.

Specifically, in the process of eliminating the NLOS errors of the TOA measurement values, the following steps may be included.

Step 1: the UE receives the PRS configuration information notified by a network, performs the downlink PRS measurement and obtains multiple TOA measurement values from each base station to the UE, where the TOA measurement values measured multiple times by the UE is called the first TOA measurement values;

Step 2: the first TOA measurement values measured multiple times has no obvious change under line of sight, and the TOA measurement values measured each time has large difference due to the influence of multipath and non-line of sight. In the present embodiment, the first TOA measurement values measured multiple times is taken as random variables, the first TOA measurement values are modeled as random variables obeying a Gaussian mixture distribution through the analysis of its probability density, and the NLOS identification is performed on the basis of this modeling. According to the modeling assumption, the probability density parameters of the first TOA measurement values are obtained and recorded as the second TOA measurement values by analyzing the probability density of the first TOA measurement values (for example, variational Dirichlet process).

It should be noted that, according to the assumption of the present embodiment, the probability density of the first TOA measurement values obeys the Gaussian mixture distribution, and probability density analysis is performed on all the measurement values, so as to obtain respective parameters of the Gaussian mixture model.

For the base station side, before S101, the method includes the following steps: sending downlink PRS configuration information to the UE by high layer signaling; and sending downlink PRS signals to the UE.

The present embodiment provides a data preprocessing method based on a Gaussian mixture model for a scenario in which there is a channel change in long period distance ranging that affects the TOA measurement results. By performing data analysis using the Gaussian mixture model, the LOS/NLOS can be further detected, so that the data being the NLOS can be corrected or eliminated, which further improves the positioning accuracy.

Further, on the basis of the above method embodiments, selecting the TOA measurement values modeled into the Gaussian mixture model in S101, specifically includes:

obtaining, among the second TOA measurement values, TOA measurement values with the smallest mean value as third TOA measurement values.

Specifically, in the process of eliminating the NLOS errors of the TOA measurement values, the following steps may be further included.

Step 3: taking the second TOA measurement values in step 2, and regarding the second TOA measurement values with the smallest mean value as the third TOA measurement values; that is, analyzing the second TOA measurement values obtained in step 2, filtering out the useless TOA measurement values so as to obtain the third TOA measurement values.

The TOA measurement values with the smallest mean value are taken by selecting the second TOA measurement values and some useless TOA measurement values can be filtered out, which improves the efficiency of subsequent processing.

Further, on the basis of the above method embodiments, S102 specifically includes: performing NLOS identification on the third TOA measurement values according to the standard deviation-based NLOS identification method or the skewness and kurtosis-based NLOS identification method to obtain fourth TOA measurement values and corresponding identification labels;

S103 specifically includes:

removing the TOA measurement values with the largest NLOS error among the fourth TOA measurement values according to the leave-one-out method or the gradient descent method to obtain the fifth TOA measurement values; and performing traversal and correction processing on corresponding fifth TOA measurement values according to each identification label to obtain corrected TOA measurement values, where the fourth TOA measurement values are obtained by performing NLOS identification on the third TOA measurement values and the fifth TOA measurement values are obtained by removing the TOA measurement values with the largest NLOS error among the fourth TOA measurement values.

Specifically, in the process of eliminating the NLOS errors of the TOA measurement values, the following steps may be further included.

Step 4: performing NLOS identification on the third TOA measurement values and labeling to obtain the fourth TOA measurement values, where the NLOS identification method includes a standard deviation-based NLOS identification method or a skewness and kurtosis-based NLOS identification method, and Step 5: removing the TOA measurement values with the largest NLOS error between the base station and the user among the fourth TOA measurement values to obtain the fifth TOA measurement values, where the removal method can include the leave-one-out method or other methods such as the gradient descent method.

After NLOS identification, the method of performing error compensation on the TOA measurement values corresponding to the NLOS includes: removing the TOA measurement values with the largest NLOS error between the base station and the user by combining the leave-one-out method, and correcting NLOS by traversing the data.

Specifically, through the positioning way which corrects NLOS errors based on the leave-one-out method and traversing data, the TOA positioning error is within 10 meters and can be effectively corrected, thereby improving the positioning accuracy.

The present embodiment combines the leave-one-out method, range residuals test (RRT), and traversal data to perform NLOS correction, and the positioning accuracy is greatly improved. Meanwhile, the NLOS is identified based on the Gaussian mixture model, which improves the probability of successful NLOS identification and provides a basis for NLOS error correction, and greatly reduces the complexity of the overall positioning algorithm.

Further, on the basis of the above method embodiments, after S103, the method further includes:

calculating user location results according to the corrected sixth TOA measurement values, a user positioning algorithm and a predefined criterion, and positioning the UE according to the user location results, where the predefined criterion includes selecting a user location with the smallest distance residual and the sixth TOA measurement values are obtained by eliminating NLOS errors of the fifth TOA measurement values.

Specifically, in the process of eliminating the NLOS errors of the TOA measurement values, the following steps may be further included.

Step 6: combining the fifth TOA measurement values processed by step 5 with the labels in step 4, reading out the NLOS measurement, and performing traversal and correction processing on the data, correcting NLOS errors to obtain the sixth TOA measurement values, and obtaining the final user location result based on the sixth TOA measurement values through the user positioning algorithm and the predefined criterion.

It should be noted that the standard deviation-based NLOS identification method or the skewness and kurtosis-based NLOS identification method in step 4, the leave-one-out method and the gradient descent method in step 5, and the user positioning algorithm in step 6 are not unique calculation methods, and the two methods in step 4 and step 5 can be used alternately, and the positioning algorithm in step 6 can be the Chan algorithm or the least square method and the like.

In the present embodiments, the positioning accuracy can be greatly improved by eliminating the NLOS errors.

Further, on the basis of the above method embodiments, the modeling the probability density of first TOA measurement values into a Gaussian mixture model to obtain second TOA measurement values represented by the Gaussian mixture model, specifically includes:

modeling the probability density of respective first TOA measurement values into a Gaussian mixture model by the following formula to obtain second TOA measurement values $p(R_{\tau_n})$:

$$p(R_{\tau_n}) = \sum_{i=1}^{k} \frac{\alpha_i}{\sigma_i \sqrt{2\pi}} \left[ \frac{-1}{2\sigma_i^2}(R_{\tau_n} - \mu_i)^2 \right] = \sum_{i=1}^{k} \alpha_i \cdot p(R_{\tau_n} | \mu_i, \sigma_i^2), \quad (1)$$

$$R_{\tau_n} \in \{R_{\tau_1}, R_{\tau_2}, \ldots, R_{\tau_N}\}.$$

where $R_{\tau_n}$ is the first TOA measurement values between the user a and the base station i obtained by performing the nth measurement; $R_{\tau_n} = r_{a,Toa,n}^i = r_{a,Ture,n}^i + r_{Bias} + w_a^i$, where $r_{a,Ture,n}^i$ is the true TOA value between the user a and the base station i obtained by performing the nth measurement, $r_{Bias}$ is an additive bias greater than zero, and $w_a^i$ a is measurement errors of the first TOA measurement values; n is number of measurements, n≤N; k is a number of change of channel that the value of $r_{Bias}$ varies with the change of channel; $\mu_i$ is a mean value of the first TOA measurement values corresponding to the base station i; $\sigma_i$ is a standard deviation of the first TOA measurement values corresponding to the base station i; $\alpha_i$ is an amplitude corresponding to the Gaussian distribution of the first TOA measurement values of the base station i, $$\sum_{i=1}^{k} \alpha_i = 1, 0 < \alpha_i < 1;$$

$p(R_{\tau_n} | \mu_i, \sigma_i^2)$ represents the probability density of $R_{\tau_n} | \mu_i, \sigma_i^2$.

Further, obtaining, among the second TOA measurement values, TOA measurement values with the smallest mean value as the third TOA measurement values specifically includes:

obtaining, among the second TOA measurement values, TOA measurement values with the smallest mean value, and taking the TOA measurement values with the smallest mean value as the third TOA measurement values between the user and the base station i:

$$z = \underset{j}{\operatorname{argmin}}(\mu_j), j \in 1, 2, \ldots, k \qquad (2)$$

where z is a serial number corresponding to the smallest mean value among the mean values $\mu_1$, $\mu_2$, ... $\mu_k$ of respective second TOA measurement values; $\mu_z$ is the mean value corresponding to the Gaussian distribution with the smallest mean value among the Gaussian mixture distribution; is the number when performing traversal the number of change of channel.

Specifically, step 1 to step 6 in the process of eliminating NLOS errors of the TOA measurement values includes the following steps.

Step 1: receiving, by the UE, the PRS configuration information notified by a network side, measuring a downlink PRS signal and obtaining TOA measurement values.

Figure 2:
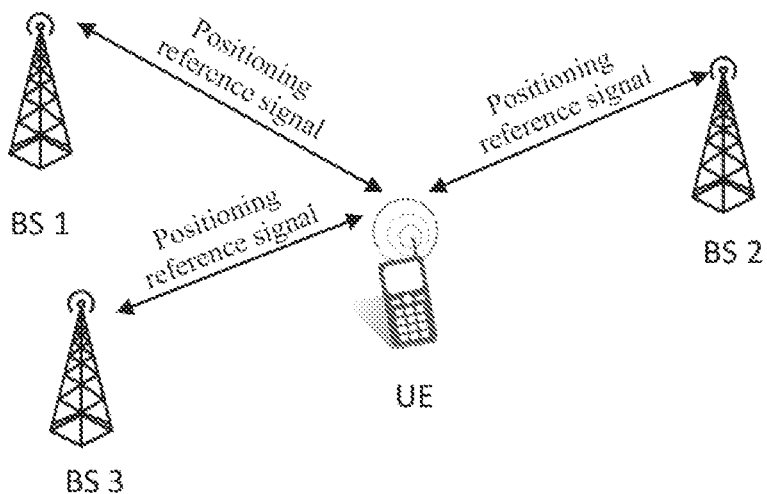
FIG. 2 is a schematic diagram of a UE positioning scenario according to an embodiment of the present application.

FIG. 2 is a schematic diagram of a TOA positioning process. The base station participating in positioning sends PRS to the terminal, and the UE side generates a PRS sequence according to the PRS information notified by the network side. When the user receives the PRS from the base station side, the received PRS and the locally generated PRS are processed together and the TOA measurement values when the PRS from the corresponding base station reaches the user are measured and then regarded as the first TOA measurement values. TOA measurement values reflect a distance between the user and the base station. When the UE does not move, the distance measurement values between multiple base stations and the UE can be obtained by repeating this step. If the wireless channel environment between the user and the base station changes during the measurement, or if the user is in the case of non-line of sight (that is, there is an obstruction between the user and the base station), there will be large differences between multiple measurement values. The problem to be solved in the present embodiment is how to identify, among the multiple measurement values, the measurement values in which the user and the base station are in the case of line of sight (there is an obstruction between the user and the base station), and another case is how to correct the error of the measurement values when the distance measurements between the user and the base station is all non-line of sight, so that the corrected measurement values are close to the measurement results in the case of line of sight.

Step 2: establishing a Gaussian mixture model of the TOA measurement values.

The accuracy of the TOA measurement values will be greatly degraded due to the influence of multipath and NLOS path. A TOA measurement from the base station to the user can be described as:

$$r_{a,Toa}{}^i = r_{a,Ture}{}^i + r_{Bias} + w_a{}^i \qquad (3)$$

where $r_{a,Toa}{}^i$ is the TOA measurement value from user a to base station i, and its unit is meters. $r_{a,Ture}{}^i$ is the true TOA value from user a to base station i, and its unit is meters. In two-dimensional positioning, it is assumed that the user coordinates can be expressed as $(x^i, y^i)$, then (x, y), and the base station coordinates are expressed as $(x^i, y^i)$, then $r_{a,Ture}{}^i = \sqrt{(x-x^i)^2 + (y-y^i)^2}$. $r_{Bias}$ is the additive bias greater than zero, which represents the influence of the multipath and NLOS caused by changes of the channel and has a size varying with the change of the terminal environment. $w_a{}^i$ is the TOA measurement errors, modeled as a Gaussian noise which has mean value of 0 and variance of $\sigma_a{}^i$.

In the present embodiment, the time-varying characteristic of the channel between the user and the base station is modeled by formula (3), where the influence of multipath and NLOS path is the main cause of the time-varying characteristic of the channel. The formula (3) is briefly analyzed, and $r_{Bias}$ represents the influence of the time-varying channel on the first TOA measurement values. If $r_{Bias}=0$, it represents that the wireless environment between the user and the base station is stable. While $r_{Bias}>0$ represents that there is an obstruction in the path between the user and the base station, for example, the signal is received by the user after being refracted by the wall. When a TOA measurement is performed, $r_{Bias}$ is regarded as a fixed value, but the value of $r_{Bias}$ will change as the measurement time increases. For example, a total of 1000 frames are used to measure the position of the base station and the terminal, for the first 0~500 frames, $r_{Bias}=C_1$, and for the last 500~1000 frames, $r_{Bias}=C_2$, where $C_1$ and $C_2$ are constants. Since the noise $w_a{}^i$ follows a Gaussian distribution, it can be known that the first TOA measurement value $r_{a,Toa}{}^i$ is a random variable according to the knowledge of probability theory, that is, the obtained values are different when measurements are performed for many times. Random variables can be described by a probability density function (PDF). Through the above analysis, $w_a{}^i$ follows a Gaussian distribution, and the values of $r_{Bias}$ are not the same in different measurement periods, thus $r_{a,Toa}{}^i$ can be regarded as the superposition of multiple Gaussian distributions with different mean values during N measurements. Continuing the above example, for the first 500 frames, the mean value of 500 $r_{a,Toa}$'s is $r_{a,Ture}+C_1$, and for the last 500 frames, the mean value of 500 $r_{a,Toa}{}^i$ s is $r_{a,Ture}{}^i+C_2$, thus it can be considered that the probability density function of the first TOA measurement values obeys the Gaussian mixture distribution.

Taking the first TOA measurement values between the user a and the base station i as an example, $r_{a,Toa}{}^i$ is written as $r_{a,Toa,n}{}^i$, and abbreviated as $R_{\tau_n}$, where n represents the TOA value of the nth measurement, and the probability density of the first TOA measurement value can be expressed as formula (1). Where p(*) represents the probability density. k is the total number of categories, representing the number of times that the value of $r_{Bias}$ varies with the change of the channel and it is considered that k≥4 in the measurement time of tens of minutes. $\mu_i$ is the mean value corresponding to each category; $\sigma_i$ is the standard deviation; $\alpha_i$ is the amplitude corresponding to each Gaussian distribution, which is called the Gaussian mixture coefficient, and the mixture coefficient should satisfy:

$$\sum_{i=1}^{k} \alpha_i = 1, 0 < \alpha_i < 1.$$

Through the formula, it can be known that when the distribution of the first TOA measurement value is determined, the following parameters need to be determined: k being the total number of categories; $\alpha_i$ being the amplitude corresponding to each Gaussian distribution; $\mu_i$ being the mean value corresponding to each category; $\sigma_i$ being the standard deviation.

$$R_{\tau_n} \sim GMM(k, \alpha_i, \mu_i, \sigma_i), i \in 1, 2, \ldots, k \qquad (4)$$

The probability density of the N $r_{a,Toa,n}^i$ results can be estimated through the variational Dirichlet process, and the probability density distribution of the first TOA measurement values can be obtained as: GMM(k, $\alpha_i$, $\mu_i$, $\sigma_i$), $i \in 1, 2, \ldots, k$.

The probability density function of the data can reflect the characteristics of the data distribution, such as the mean value, variance and other distribution characteristics of the first TOA measurement values. The parameters of the probability density distribution are analyzed below. k is the number of categories of the mixture model, and in the present embodiment, it represents the number of change of channel during measurement. Taking measuring during 1000 frames where for the first 500 frames $r_{Bias}=C_1$, and for the last 500 frames $r_{Bias}=C_2$ as an example, k=2 at this time and the corresponding mean values are $\mu_1 = r_{a,Ture}^i + C_1$ and $\mu_2 = r_{a,Ture}^i + C_2$. The mean value and variance $N(\mu_i,(\sigma_i)^2)$, $i \in 1, 2, \ldots, k$ are recorded as the second TOA measurement values for subsequent processing. If measurement is performed during 1000 frames, there are 1000 first TOA measurement values $r_{a,Toa,n}^i$, and there are only 2k second TOA measurement values (k mean values and k variance) after probability density analysis is performed on the 1000 first TOA measurement value.

It should be noted that the TOA measurement essentially reflects the change of the channel. In this step, whether the transmission path from the user to the base station is blocked at different times is reflected by modeling (Gaussian mixture model) the TOA measurement values. The advantage of this step is that through the analysis of the Gaussian mixture model, the user can be provided with the possibility for NLOS identification in the case of only a few TOA measurement values at the receiving end without any prior information.

Step 3: taking the Gaussian distribution with the smallest mean value $\mu_i$ among the Gaussian mixture model obtained in step 2 as the third TOA measurement values.

Figure 3:
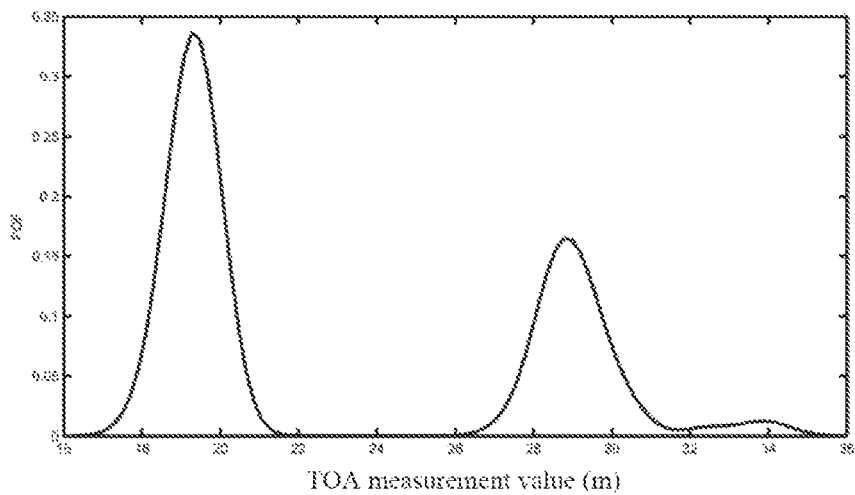
FIG. 3 is a schematic diagram of a probability distribution of a Gaussian mixture model according to an embodiment of the present application.

The N TOA measurement values form a Gaussian mixture distribution, and the parameters of the Gaussian mixture distribution can be obtained through a variational Dirichlet process. FIG. 3 shows the Gaussian mixture model obtained by processing the TOA measurement values between a certain user and the base station.

According to formula (3), the user TOA measurement value $r_{a,Toa}^i$ consists of the user location true value $r_{a,Ture}^i$, the forward deviation $r_{Bias}$ and the noise $w_a^i$, so the mean value of $r_{a,Toa}^i$ should be greater than or equal to the true value $r_{a,Ture}^i$ of the user position, that is: $E[r_{a,Toa}^i] > E[r_{a,Ture}^i] = r_{a,Ture}^i$; and corresponding to the second TOA measurement values, there should be: $\mu_i \geq r_{a,Ture}^i$, $i \in 1, 2, \ldots, k$.

Therefore, corresponding to the second TOA measurement values, since the mean value of all Gaussian distributions exceeds the true value, only the set of Gaussian distributions with the smallest mean value needs to be taken for NLOS identification, as shown in formula (2), the rest of the Gaussian distributions can be directly determined as NLOS path.

The Gaussian distribution corresponding to the minimum mean value is taken out for subsequent NLOS test. The TOA measurement values corresponding to this Gaussian distribution are the third TOA measurement values.

It should be noted that in this step, most of the TOA measurement values being NLOS are filtered out by analyzing the mean value of the Gaussian mixture distribution. Based on the model assumption, most of the TOA measurement values corresponding to NLOS can be quickly and accurately excluded through the analysis of the relationship between the mean values and the LOS path.

Step 4: identifying NLOS based on Gaussian mixture model.

Methods for identifying NLOS based on Gaussian mixture model includes standard deviation-based NLOS identification method and skewness and kurtosis-based NLOS identification method.

The standard deviation-based NLOS identification method is as follows.

According to formula (3), there are two reasons causing the TOA measurement errors:
1) positive bias $r_{Bias}$ caused by NLOS;
2) measurement noise $w_a^i$.

$r_{Bias}$ is approximately 0 in the absence of the NLOS path, so the measured TOA measurement results should obey the Gaussian distribution having mean value of 0 and variance of $\sigma$. In the presence of the NLOS path, since the NLOS errors and the measurement errors are independent of each other, for the third TOA measurement value, the Gaussian component with larger variance can be considered to have the NLOS path. Therefore, a binary detection model can be constructed as:

$$\begin{cases} LOS, \sigma_z \leq \sigma_{Th} \\ NLOS, \sigma_z > \sigma_{Th} \end{cases} \quad (5)$$

where $\sigma_{Th}$ is a threshold standard deviation, which can be set according to different practical environments. In the present embodiment, the reference threshold is $\sigma_{Th}=1$, and the Gaussian distribution with a standard deviation being less than 1 meter is considered to be the LOS path, and the rest are NLOS paths. The identified third TOA measurement values are labeled as (LOS/NLOS), and taken as the input values for subsequent NLOS correction and final positioning, that is, $r_{a,Toa\_final}^i = \mu$. The labeling method includes: adding a variable j to each measured value, where $j \in [0,1]$, and when the measurement value is LOS path, j=1, otherwise j=0. The labeled TOA measurement values are recorded as the fourth TOA measurement values.

Figure 4:
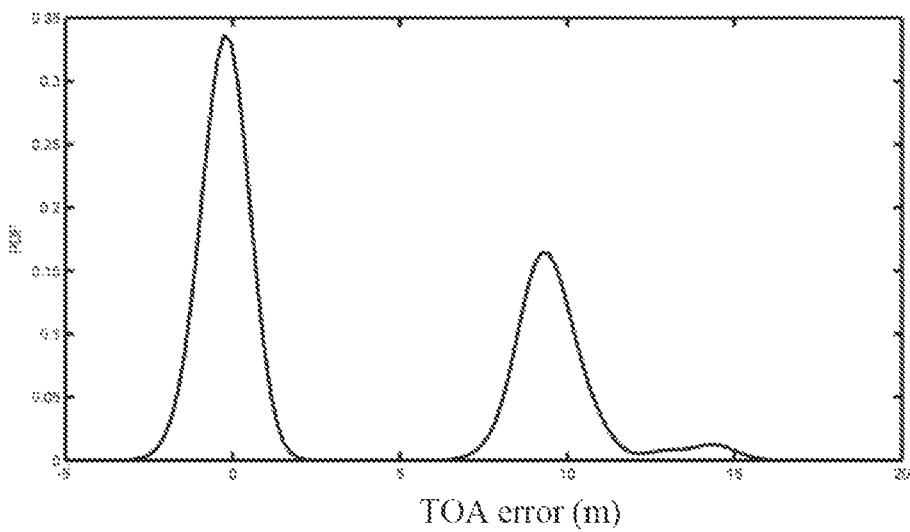
FIG. 4 is a schematic diagram of a TOA error distribution curve with line of sight according to an embodiment of the present application.
Figure 5:
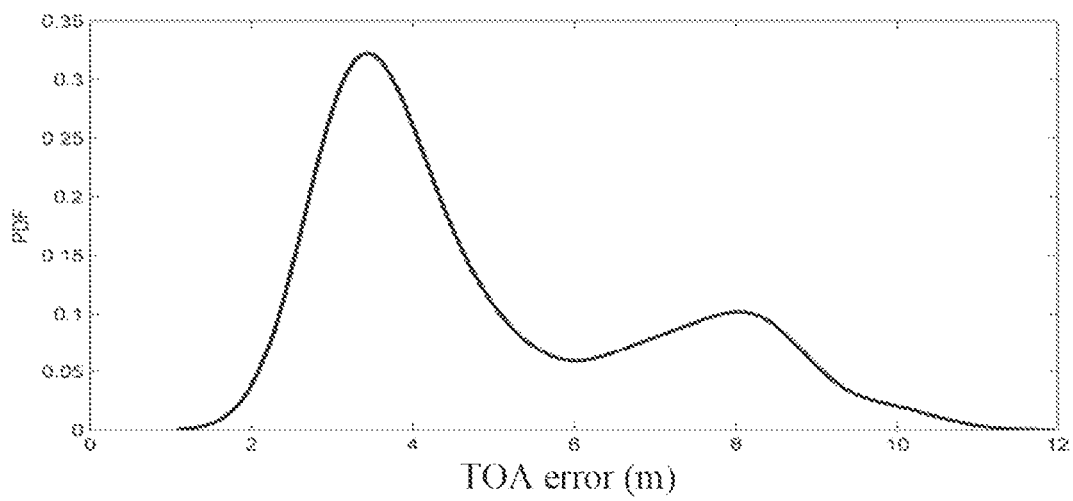
FIG. 5 is a schematic diagram of a TOA error distribution curve without line of sight according to an embodiment of the present application.

FIG. 4 and FIG. 5 show graphical representations of the Gaussian mixture distribution in the presence of the LOS path and only in the presence of the NLOS path, respectively. It can be seen from the figures that the standard deviation of NLOS is much larger than that of LOS path.

Error probability distribution map of TOA can be obtained after the measurement is performed during N=1000. That is:

$$TOA\_error = r_{a,Toa}^i - r_{a,Ture}^i = r_{Bias} + w_a^i \quad (6)$$

It can be analyzed from FIG. 5 that in this example, k=3, $\mu_1=0$, $\mu_2=9.3$, $\mu_3=14.2$ and $\sigma_1=0.9 < \sigma_2 < \sigma_3$.

The skewness and kurtosis-based NLOS identification method is as follows.

It can be seen from the above analysis that the measurement values being the LOS path should obey the Gaussian distribution, while the measurement values being the NLOS has a high probability of not obeying the standard Gaussian distribution. The skewness and kurtosis are an important tool to test whether the sample conforms to the Gaussian distribution, so the skewness and kurtosis can be used to identify NLOS.

Testing for slope and skewness requires all TOA measurement values corresponding to the Gaussian distribution with the smallest mean value. Therefore, TOA measurement values need to be simply classified required The first TOA values are detected by using the Mahalanobis distance to find the TOA measurement values corresponding to the Gaussian distribution with minimum mean value.

$$D_{j,n}^2 = \frac{(R_{\tau_n} - \mu_j)^2}{\sigma_j^2}, j \in \{1, \ldots, k\}, n \in \{1, \ldots, N\} \quad (7)$$

For the nth data $D_{j,n}^2$, $j \in \{1, \ldots, k\}$ is traversed. If $D_{k,n}^2$ is the smallest when j=k, the nth first TOA measurement values correspond to the kth category.

$$\begin{cases} n \in N(\mu_z, \sigma_z^2), z = \arg\min_j(D_{j,n}^2) \\ n \notin N(\mu_z, \sigma_z^2), \text{otherwise} \end{cases} j \in \{1, \ldots, k\} \quad (8)$$

Skewness can detect whether the sample is symmetrically distributed, and the kurtosis of samples having the symmetrical distribution is 0. It is assumed that there are m TOA measurement values corresponding to the Gaussian distribution with minimum mean values, then it can be tested using skewness:

$$S = \frac{\frac{1}{m}\sum_{i=1}^{m}(R_{\tau_i} - \mu_z)^3}{\sigma_z^3}, i \in \{1, \ldots, m\}. \quad (9)$$

The kurtosis of the Gaussian distribution is 3, and the kurtosis can be used to verify whether the sample is a Gaussian distribution:

$$K = \frac{\frac{1}{m}\sum_{i=1}^{m}(R_{\tau_i} - \mu_z)^4}{\sigma_z^4}, i \in \{1, \ldots, m\} \quad (10)$$

Therefore, a second binary detection model can be constructed:

$$\begin{cases} LOS, S = 0 \ \& \ K = 3 \\ NLOS, \text{otherwise} \end{cases} \quad (11)$$

The mean value of the identified Gaussian distribution is labelled by (LOS/NLOS), and taken as the input values for subsequent NLOS correction and final positioning, that is, $r_{a,Toa\_final}^i = \mu$. The labeled TOA measurement values are recorded as the fourth TOA measurement values.

It should be noted that, by applying the standard deviation-based NLOS identification method or the skewness and kurtosis-based NLOS identification method in the assumed model of the present embodiment, the NLOS measurement values which are not identified in step 3 can be accurately and quickly identified, which can provide accurate data for the subsequent NLOS processing and user positioning.

Step 5: removing the NLOS measurement values with the largest error.

Figure 6:
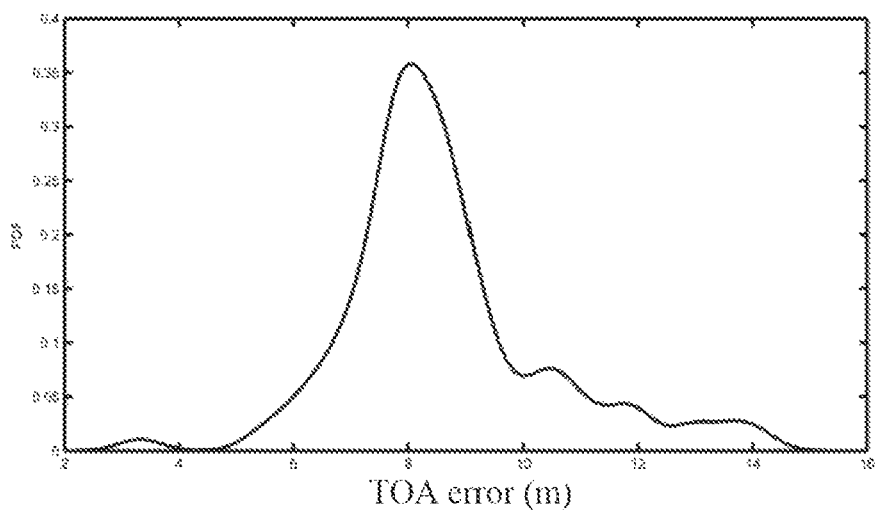
FIG. 6 is a schematic diagram of a TOA error distribution curve with large NLOS variance according to an embodiment of the present application.

Traversal processing and error correction are performed on the path identified as having NLOS between the user and the base station. In order to further reduce the computational complexity, it is necessary to perform distance residual detection based on the leave-one-out method before correction. Taking the positioning of a single user and m base stations as an example, the purpose of the detection is to find the base station with the largest NLOS error and eliminate it, and reserve the remaining m−1 base stations for positioning. Since the larger NLOS error cannot be corrected by the traversal processing, the base station to which the largest NLOS error belongs is eliminated, which not only ensures the validity of the algorithm, but also reduces the computational complexity. As shown in FIG. 6, the average NLOS error between a certain base station and a user is about 8 meters, which has greatly affected the positioning accuracy, and is difficult to be effectively corrected and thus this base station should be eliminated, and the measurement result of this base station is regarded as invalid data. The method to identify the maximum NLOS error is as follows.

It is assumed that m (m>3) base stations participate in user positioning, and m−1 base stations is taken for positioning, thus there are total $C_m^{m-1}$ combinations. (leave-one-out method)

Each combination is positioned using the Chan algorithm respectively, and the input is m−1 fourth TOA measurement values $r_{a,Toa\_final}^i$, i=1, ..., m−1.

The user location is determined through the Chan algorithm by combining with the input, and the initial value ($x_o$, $y_o$) of the user location is obtained.

The distance residual is defined as:

$$d = \sum_{i=1}^{m-1} \left| \sqrt{(x_o - x_i)^2 + (y_o - y_i)^2} - r_{a,Toa\_final}^i \right|,$$

where ($x_i$, $y_i$) is the coordinates of the base station, and m is the number of base stations.

Different combinations will calculate different user positions ($x_o$, $y_o$), and then have different distance residuals. The combination with the smallest distance residual is selected. Taking six base stations as an example, it is assumed that the combination with the smallest distance residual is 1, 2, 3, 4, 6, then it can be determined that the position error of the base station 5 is the largest, then the base station 5 is eliminated, and will not participate in the subsequent positioning. The distance residual $d_{min}$ at this time is recorded, and the TOA measurement combination obtained at this time is the fifth TOA measurement values.

It should be noted that applying this step can speed up the operation of subsequent steps, and the subsequent computational complexity can be reduced by eliminating the maximum NLOS error measurement. Through this step, a maximum NLOS error measurement can be eliminated, and multiple measurements can also be eliminated. The elimination of inaccurate measurements will not only speed up operation, but also improve positioning accuracy.

Step 6: correcting the NLOS errors by traversing data to obtain the sixth TOA measurement values, and then obtaining the final user location result based on the predefined criteria, where the predefined criteria include selecting the user location with the smallest distance residual.

The combined TOA measurement values from which a TOA measurement value with the large NLOS error are eliminated in step 5 are taken out, and are read according to LOS/NLOS label. The LOS measurement values are not processed, and J(J≤m−1) NLOS measurement values are obtained.

The value of the minimum distance residual $d_{min}$ is determined, and if $d_{min} \leq 8*(m-1)$, small step error correction is carried out, otherwise large step correction is carried out. In this application, the small step length is taken as 1 meter, and the large step length is taken as 5 meters.

The small step interval is set as: [0, 2, 3, 4], and the large step interval is set as: [0,5,10,15] Since the NLOS error is unknown and positive, the TOA measurement values determined to be the NLOS error needs to subtract all the values in the interval in turn, so as to obtain the corrected TOA measurement $r_{a,Toa\_update}^{i}$. Taking the small step as an example, $r_{a,Toa\_update}^{i} = r_{a,Toa\_final}^{i} - c$, $c \in [0, 2, 3, 4]$, the TOA correction values obtained at this time are the sixth TOA measurement values. Each time the NLOS error correction is performed, the fifth TOA measurement values are used to perform a user location determination (($x_{new}$, $y_{new}$)) based on the Chan algorithm. When the use location is determined once, a distance residual detection needs to be performed once:

$$d = \sum_{i=1}^{m-1} \left| \sqrt{(x_{new} - x_i)^2 + (y_{new} - y_i)^2} - r_{a,Toa\_update}^{i} \right|.$$

If there are J NLOS errors, there are $J^4$ NLOS error corrections, accompanied with $J^4$ user location positioning results and $J^4$ distance residuals.

The values with the smallest distance residual are selected, and the user location at this time is determined as the final user position.

It should be noted that, by performing the traversal processing and NLOS correction on the fifth TOA values, the user location is determined based on the minimum distance residual error, thereby greatly improving the user's positioning accuracy in the NLOS scenario.

In the present embodiment, by modeling the probability density of the TOA measurement values as a Gaussian mixture model, and using the variational Dirichlet process to obtain the parameters of the mixture model, this method can be used to model the influence of channel change on received signals equivalently when the user does not have more information about the wireless environment between the user and the base station. For the case that the user channel changing with time during TOA measurement, this method ensures that the TOA measurement values corresponding to the LOS paths can be accurately found when the LOS and NLOS are in aliasing. For the case that the TOA measurement values are all NLOS, this application can identify and correct it. Therefore, the final positioning result of the user is more accurate.

In the specific execution process, the execution process at a base station side includes the following steps.

A1: sending downlink PRS configuration information to the UE through high layer signaling, for example: BW=50 MHz, the PRS resource including 6 OFDM symbols, and the Comb factor being 6; and A2: sending, by six base stations, downlink PRS signals to the UE respectively and continuing for a period of time, for example 1000 frames.

The execution process at a U E side includes the following steps.

B1: receiving, the UE, the PRS configuration information notified by a network, measuring the downlink PRS signal and obtaining TOA measurement values from each base station to the UE, and counting the TOA measurement results during multiple frames where there are 1000 TOA measurement values between each base station and the UE and taking the base station i to user a as an example, the 1000 TOA measurement values are regarded as the first TOA measurement values;

B2: processing using the first TOA measurement values from each base station to the user, regarding the first TOA measurement values as random variables, analyzing its probability density (for example, using a variational Dirichlet process) to obtain a Gaussian mixture model, assuming that the channel between the base station i and the user a changes twice, then there are two Gaussian distributions for mixing: $N(\mu_1,(\sigma_1)^2)$ and $N(\mu_2,(\sigma_2)^2)$, regarding $\mu_1$, $\sigma_1$, $\mu_2$ and $\sigma_2$ as the second TOA measurement values;

B3: taking the mean value $\mu_1$, $\mu_2$ of each Gaussian distribution obtained in B2, and regarding the smallest mean value as the third TOA measurement value; assuming that $\mu_1 < \mu_2$, then the third TOA measurement value is $N(\mu_1,(\sigma_1)^2)$;

B4: performing NLOS identification on the third TOA measurement values ($N(\mu_1,(\sigma_1)^2)$) and labeling it to obtain the fourth TOA measurement values, where the NLOS identification method includes a standard deviation-based NLOS identification method or a skewness and kurtosis-based NLOS identification and the fourth TOA measurement at this time is $N(\mu_1,(\sigma_1)^2)$, LOS/NLOS;

B5: all taking the base station i to the user a as an example in all B2 to B4, and assuming that there are six base stations involved in the positioning, then there are six fourth TOA measurement values, taking the mean value $\mu_i$, $i \in [1 \ldots 6]$ of each measurement value, and eliminating the TOA measurement values with the largest NLOS error between the base station and the user to obtain five fifth TOA measurement values $N(\mu_i,(\sigma_i)^2)$, LOS/NLOS, $i \in [1, 2, 3, 5, 6]$, where the eliminating method can be the leave-one-out method and assuming that six base stations participate in the positioning, the TOA result of the 4th base station is eliminated adopting B5; and B6: reading the LOS/NLOS label of the fifth measurement values (assuming base stations 1, 2, 3 are LOS, base stations 5 and 6 are NLOS), traversing the mean value data of the fifth measurement values corresponding to the NLOS label, and correcting the NLOS error to obtain the sixth TOA measurement values (including the fifth TOA measurement values of the uncorrected base stations 1, 2, 3, and the sixth TOA measurement values of the corrected base stations 5, 6), and obtaining the final user location result based on $\mu_q$, $q \in [1,2,3,5,6]$ and the predefined criterion, where the predefined criteria include selecting the user location with the smallest distance residual.

Figure 7:
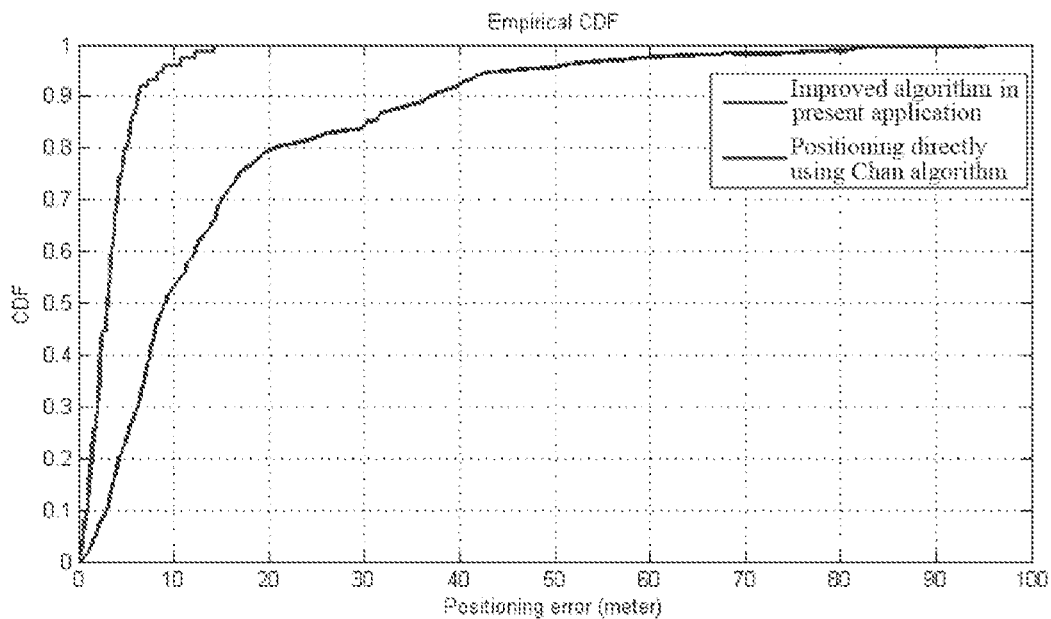
FIG. 7 is a schematic diagram of a final positioning error CDF distribution curve according to an embodiment of the present application.

FIG. 7 shows the simulation results under three indoor scenarios under the bandwidth of 50 MHZ. As a comparison, the unimproved Chan algorithm is simulated under the same conditions; the input of the improved algorithm and Chan algorithm are the same TOA measurement data. The results that the final positioning accuracy is greatly improved by the TOA measurement values which are identified and corrected by NLOS.

In the present embodiment, the problem of error identification and compensation of the radio communication positioning system based on the TOA measurement values under the NLOS channel condition is solved, and the accuracy of the user location calculation is further improved by reducing the errors of the TOA measurement values.

Figure 8:
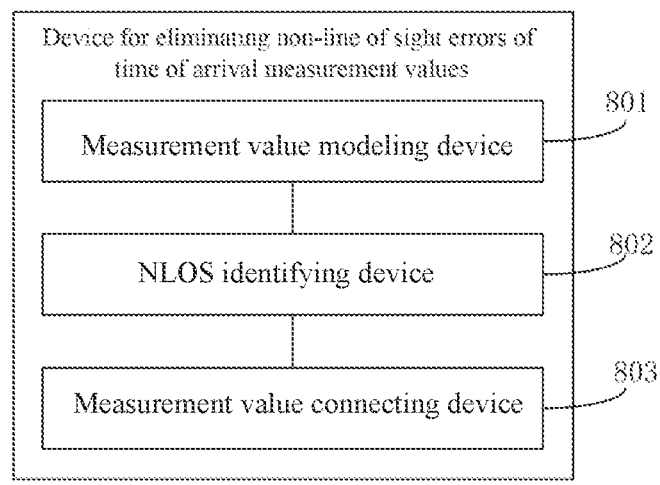
FIG. 8 is a schematic structural diagram of a device for eliminating non-line of sight errors of time of arrival measurement values according to an embodiment of the present application.

FIG. 8 shows a schematic structural diagram of a device for eliminating non-line of sight (NLOS) errors of time of arrival (TOA) measurement value provided in the present embodiment, the device includes: a measurement value modeling device 801, a NLOS identifying device 802, and a measurement value correcting device 803, where:

the measurement value modeling device 801 is configured to model the probability density of the TOA measurement values from each base station to a terminal into a Gaussian mixture model, and screen the TOA measurement values modeled into the Gaussian mixture model;

the NLOS identifying device 802 is configured to perform non-line of sight (NLOS) identification on the selected TOA measurement values, to obtain an identification label; where the identification label is used for indicating whether the selected TOA measurement values correspond to NLOS; and the measurement value correcting device 803 is configured to correct the selected TOA measurement values according to the identification label to eliminate NLOS errors of the selected TOA measurement values.

Specifically, the measurement value modeling device 801 models the probability density of the TOA measurement values from each base station to a terminal into a Gaussian mixture model, and screens the TOA measurement values modeled into the Gaussian mixture model; the NLOS identifying device 802 performs NLOS identification on the selected TOA measurement values to obtain an identification label; where the identification label is used for indicating whether the selected TOA measurement values correspond to NLOS; the measurement value correcting device 803 corrects the selected TOA measurement values according to the identification label, to eliminate NLOS errors of the selected TOA measurement values.

In the present embodiment, by modeling the probability density of each TOA measurement value into a Gaussian mixture model and selecting, it is ensured that the TOA measurement values corresponding to the LOS path are accurately found in the case that LOS and NLOS are in aliasing; meanwhile, the NLOS errors of the selected TOA measurement values are eliminated by correcting the selected TOA measurement values, which improves the positioning accuracy of the user.

The device for eliminating NLOS errors of the selected TOA measurement values described in the present embodiment can be used to execute the above method embodiments, and its principles and effects are similar, thus details are not described herein again.

Figure 9:
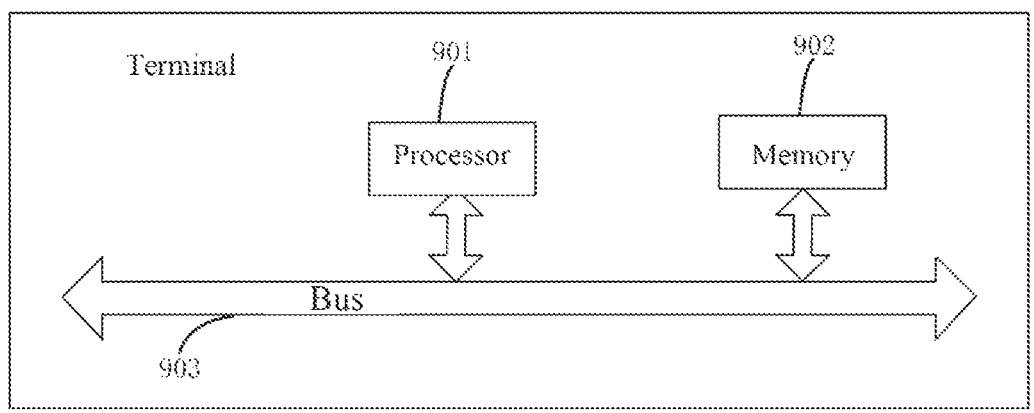
FIG. 9 is a logical block diagram of an electronic device according to an embodiment of the present application.

Referring to FIG. 9, the electronic device includes: a processor 901, a memory 902 and a bus 903; where the processor 901 and the memory 902 communicate with each other through the bus 903;

the processor 901 is configured to invokes the program instructions stored in the memory 902 to execute the following steps:

modeling the probability density of the time of arrival (TOA) measurement values from each base station to a terminal into a Gaussian mixture model, and selecting the TOA measurement values modeled into the Gaussian mixture model;

performing non-line of sight (NLOS) identification on the selected TOA measurement values to obtain an identification label; where the identification label is used for indicating whether the selected TOA measurement values correspond to NLOS; and correcting the selected TOA measurement values according to the identification label to eliminate NLOS errors of the selected TOA measurement values.

In the present embodiment, by modeling the probability density of each TOA measurement value into a Gaussian mixture model and selecting, it is ensured that the TOA measurement values corresponding to the LOS path are accurately found in the case that LOS and NLOS are in aliasing; meanwhile, the NLOS errors of the selected TOA measurement values are eliminated by correcting the selected TOA measurement values, which improves the positioning accuracy of the user.

Further, on the basis of the above embodiments, modeling the probability density of the TOA measurement value from each base station to a terminal into a Gaussian mixture model, specifically includes:

modeling the probability density of first TOA measurement values into a Gaussian mixture model to obtain second TOA measurement values represented by the Gaussian mixture model, where the first TOA measurement values measured by the UE are the TOA measurement values from each base station to the UE.

Further, on the basis of the above embodiments, modeling the probability density of first TOA measurement values into a Gaussian mixture model to obtain second TOA measurement values represented by the Gaussian mixture model, specifically includes:

modeling the probability density of respective first TOA measurement values into a Gaussian mixture model by the following formula to obtain second TOA measurement values $p(R_{\tau_n})$:

$$p(R_{\tau_n}) = \sum_{i=1}^{k} \frac{\alpha_i}{\sigma_i \sqrt{2\pi}} \left[ \frac{-1}{2\sigma_i^2}(R_{\tau_n} - \mu_i)^2 \right] = \sum_{i=1}^{k} \alpha_i \cdot p(R_{\tau_n} | \mu_i, \sigma_i^2),$$

$$R_{\tau_n} \in \{R_{\tau_1}, R_{\tau_2}, \ldots, R_{\tau_N}\}.$$

where $R_{\tau_n}$ is the first TOA measurement values between the user a and the base i station obtained by performing the nth measurement; $R_{\tau_n} = r_{a,Toa,n}{}^i = r_{a,Ture,n}{}^i + r_{Bias}{}^i + w_a{}^i$, where $r_{a,Ture,n}{}^i$ is the true TOA value between the user a and the base station i obtained by performing the nth measurement, $r_{Bias}{}^i$ is the additive bias greater than zero, and $w_a{}^i$ is the measurement errors of the first TOA measurement values; n is number of measurements, n≤N; k is number of change of channel that the value of $r_{Bias}$ varies with the channel; $\mu_i$ is the mean value of the first TOA measurement values corresponding to the base station i; $\sigma_i$ is the standard deviation of the first TOA measurement values corresponding to the base station i; $\alpha_i$ is the amplitude corresponding to the Gaussian distribution of the first TOA measurement values of the base station i, $$\sum_{i=1}^{k} \alpha_i = 1, 0 < \alpha_i < 1; p(R_{\tau_n} | \mu_i, \sigma_i^2)$$

represents the probability density of $R_{\tau_n} | \mu_i, \sigma_i^2$.

Further, on the basis of the above embodiments, selecting the TOA measurement values modeled into the Gaussian mixture model, specifically includes: obtaining, among the second TOA measurement values, TOA measurement values with the smallest mean value as the third TOA measurement values.

Further, on the basis of the above embodiments, obtaining, among the second TOA measurement values, the TOA measurement values with the smallest mean value as the third TOA measurement values, specifically includes:

obtaining, among the second TOA measurement values, the TOA measurement values with the smallest mean value, and taking the TOA measurement values with the smallest mean value as the third TOA measurement values between the user and the base station i:

$$z = \arg\min_{j}(\mu_j), j \in 1, 2, \ldots, k.$$

where z is a serial number corresponding to the smallest mean value among the mean values $\mu_1, \mu_2, \ldots \mu_k$, of respective second TOA measurement values; $\mu_z$ is the mean value corresponding to the Gaussian distribution with the smallest mean value among the Gaussian mixture distribution; j is the number when performing traversal the number of change of channel.

Further, on the basis of the above embodiments, performing NLOS identification on the selected TOA measurement values to obtain an identification label, specifically includes:

performing NLOS identification on the third TOA measurement values according to the standard deviation-based NLOS identification method or the skewness and kurtosis-based NLOS identification method to obtain the fourth TOA measurement values and the corresponding identification label;

correcting the selected TOA measurement values according to the identification label, specifically including:

eliminating the TOA measurement values with the largest NLOS error among the fourth TOA measurement values according to the leave-one-out method or the gradient descent method to obtain the fifth TOA measurement values; and performing correction processing on the corresponding fifth TOA measurement values according to each identification label to obtain the corrected TOA measurement values.

Further, on the basis of the above embodiments, after correcting the selected TOA measurement values according to the identification label, the method further includes:

calculating user location results according to the corrected sixth TOA measurement values, a user positioning algorithm and a predefined criterion, and positioning the UE according to the user location results;

where the predefined criterion includes selecting the user location with the smallest distance residual.

Further, on the basis of the above embodiments, before the modeling the probability density of TOA measurements from each base station to a terminal into a Gaussian mixture model, and selecting the TOA measurement values modeled into the Gaussian mixture model, the method further includes:

receiving the positioning reference signal (PRS) configuration information sent by each base station, and performing downlink PRS measurement according to respective PRS configuration information to obtain the TOA measurement values from each base station to the UE.

The device for eliminating non-line of sight in time of arrival measurement value described in the present embodiment can be used to execute the above method embodiments, and its principles and effects are similar, thus details are not described herein again.

The present embodiment discloses a computer program product, the computer program product includes a computer program stored on a non-transitory computer-readable storage medium, where the computer program includes program instructions, that, when executed by a computer, perform the following steps:

modeling the probability density of time of arrival (TOA) measurement values from each base station to a terminal into a Gaussian mixture model, and selecting the TOA measurement values modeled into the Gaussian mixture model;

performing non-line of sight (NLOS) identification on the selected TOA measurement values to obtain an identification label, the identification label is used for indicating whether the selected TOA measurement values correspond to NLOS; and correcting the selected TOA measurement values according to the identification label, to eliminate NLOS errors of the selected TOA measurement values.

The present embodiment provides a non-transitory computer-readable storage medium, where the non-transitory computer-readable storage medium stores computer instructions, and the computer instructions cause the computer to execute the following steps:

modeling the probability density of time of arrival (TOA) measurement values from each base station to a terminal into a Gaussian mixture model, and selecting the TOA measurement values modeled into the Gaussian mixture model;

performing non-line of sight (NLOS) identification on the selected TOA measurement values to obtain an identification label, the identification label is used for indicating whether the selected TOA measurement values correspond to NLOS; and correcting the selected TOA measurement values according to the identification label, to eliminate NLOS errors of the selected TOA measurement values.

The device embodiments described above are merely illustrative, where the units described as separate components may or may not be physically separate, and the components displayed as units may or may not be physical units, that is, may be located at the same place or be distributed to multiple network units. Some or all of the devices may be selected according to practical needs to achieve the purpose of the solution of the present embodiment. Those skilled in the art can understand and implement the solution described above without paying creative works.

Through the description of the embodiments above, those skilled in the art can clearly understand that the various embodiments can be implemented by means of software and a necessary general hardware platform, and of course, by hardware. Based on such understanding, the above solutions of the present application in essence or a part of the technical solutions that contributes to the prior art may be embodied in the form of a software product, which may be stored in a storage medium such as ROM/RAM, magnetic discs, optical discs and the like, and includes several instructions to cause a computer device (which may be a personal computer, a server, or a network device and the like) to perform the methods described in various embodiments or a part thereof.

It should be noted that: the above embodiments are only used to explain the solutions of the present application, and are not limited thereto. Although the present application has been described in detail with reference to the foregoing embodiments, it should be understood by those skilled in the art that: they can still modify the solutions documented in the foregoing embodiments or make equivalent substitutions to a part of the technical features; these modifications and substitutions do not make the essence of the corresponding solutions depart from the scope of the solutions of various embodiments of the present application.

What is claimed is:

1. A method for eliminating non-line of sight (NLOS) errors of time of arrival (TOA) measurement values, comprising:
modeling a probability density of the TOA measurement values from each base station to a terminal into a Gaussian mixture model, and selecting the TOA measurement values modeled into the Gaussian mixture model;
performing NLOS identification on selected TOA measurement values to obtain an identification label, the identification label is used for indicating whether the selected TOA measurement values correspond to NLOS; and
correcting the selected TOA measurement values according to the identification label to eliminate NLOS errors of the selected TOA measurement values.

2. The method of claim 1, wherein the modeling the probability density of the TOA measurement values from each base station to the terminal into the Gaussian mixture model, comprises:
modeling a probability density of first TOA measurement values into a Gaussian mixture model to obtain second TOA measurement values represented by the Gaussian mixture model,
wherein the first TOA measurement values are measured by the terminal and from each base station to the terminal.

3. The method of claim 2, wherein the modeling the probability density of the first TOA measurement values into a Gaussian mixture model to obtain second TOA measurement values represented by the Gaussian mixture model, comprises:
modeling the probability density of respective first TOA measurement values into a Gaussian mixture model by the following formula to obtain second TOA measurement values $p(R_{\tau_n})$ $$p(R_{\tau_n}) = \sum_{i=1}^{k} \frac{\alpha_i}{\sigma_i \sqrt{2\pi}} \left[ \frac{-1}{2\sigma_i^2} (R_{\tau_n} - \mu_i)^2 \right] = \sum_{i=1}^{k} \alpha_i \cdot p(R_{\tau_n} | \mu_i, \sigma_i^2),$$

$$R_{\tau_n} \in \{R_{\tau_1}, R_{\tau_2}, \ldots, R_{\tau_N}\},$$

where $R_{\tau_n}$ is the first TOA measurement values between the user a and the base station i obtained by performing the nth measurement; $R_{\tau_n} = r_{a,Toa,n}{}^i = r_{a,Ture,n}{}^i + r_{Bias} + w_a{}^i$, where $r_{a,Ture,n}{}^i$ is the true TOA value between the user a and the base station i obtained by performing the nth measurement, $r_{Bias}$ is an additive bias greater than zero, and $w_a{}^i$ a is measurement errors of the first TOA measurement values; n is number of measurements, n≤N; k is a number of change of channel that the value of $r_{Bias}$ varies with the change of channel; $\mu_i$ is a mean value of the first TOA measurement values corresponding to the base station i; $\sigma_i$ is a standard deviation of the first TOA measurement values corresponding to the base station i; $\alpha_i$ is an amplitude corresponding to the Gaussian distribution of the first TOA measurement values of the base station i, $$\sum_{i=1}^{k} \alpha_i = 1, 0 < \alpha_i < 1; p(R_{\tau_n} | \mu_i, \sigma_i^2)$$

represents the probability density of $R_{\tau_n}|\mu_i,\sigma_i^2$.

4. The method of claim 2, wherein the selecting the TOA measurement values modeled into the Gaussian mixture model comprises:
obtaining, among the second TOA measurement values, TOA measurement values with the smallest mean value as third TOA measurement values.

5. The method of claim 4, wherein the obtaining, among the second TOA measurement values, TOA measurement values with the smallest mean value as third TOA measurement values comprises:
obtaining, among the second TOA measurement values, the TOA measurement values with the smallest mean value, and taking the TOA measurement values with the smallest mean value as the third TOA measurement values between the user and the base station i:

$$z = \arg\min_{j}(\mu_j), j \in 1, 2, \ldots, k,$$

wherein Z is a serial number corresponding to the smallest mean value among the mean values $\mu_1, \mu_2 \ldots \mu_k$, of respective second TOA measurement values; $\mu_z$ is the mean value corresponding to a Gaussian distribution with the smallest mean value among Gaussian mixture distribution; j is number when performing traversal the number of change of channel.

6. The method of claim 5, wherein the performing NLOS identification on selected TOA measurement values to obtain an identification label, comprises:
performing the NLOS identification on the third TOA measurement values according to a standard deviation-based NLOS identification method or a skewness and kurtosis-based NLOS identification method to obtain fourth TOA measurement values and a corresponding identification label; and
wherein the correcting the selected TOA measurement value according to the identification label, comprises:
eliminating TOA measurement values with a largest NLOS error among the fourth TOA measurement values according to a leave-one-out method or a gradient descent method, to obtain fifth TOA measurement values;
performing traversal correction processing on corresponding fifth TOA measurement values according to each identification label to obtain corrected sixth TOA measurement values.

7. The method of claim 6, wherein after the correcting the selected TOA measurement values according to the identification label, further comprising:
calculating user location results according to the corrected sixth TOA measurement values, a user positioning algorithm and a predefined criterion, and positioning the terminal according to the user location results;
wherein the predefined criterion comprises selecting a user location with a smallest distance residual.

8. The method of claim 1, wherein before the modeling the probability density of TOA measurement values from each base station to the terminal into the Gaussian mixture model, and selecting the TOA measurement values modeled into the Gaussian mixture model, the method further comprises:

receiving positioning reference signal (PRS) configuration information sent by each base station, and performing downlink PRS measurement according to each PRS configuration information to obtain the TOA measurement values from each base station to the terminal.

9. A terminal, comprising a memory, a processor, and a program stored in the memory and executable by the processor, wherein the program, when executed by the processor, causes the processor to implement the following steps:

modeling a probability density of time of arrival (TOA) measurement values from each base station to a terminal into a Gaussian mixture model, and selecting the TOA measurement values modeled into the Gaussian mixture model;

performing non-line of sight (NLOS) identification on selected TOA measurement values to obtain an identification label, the identification label is used for indicating whether the selected TOA measurement values correspond to NLOS; and correcting the selected TOA measurement values according to the identification label, to eliminate the NLOS errors of the selected TOA measurement values.

10. The terminal of claim 9, wherein the modeling the probability density of the TOA measurement values from each base station to the terminal into the Gaussian mixture model, comprises:

modeling the probability density of the first TOA measurement values into a Gaussian mixture model to obtain second TOA measurement values represented by a Gaussian mixture model;

wherein the first TOA measurement values are measured by the terminal and from each base station to the terminal.

11. The terminal of claim 10, wherein the modeling the probability density of the first TOA measurement values into a Gaussian mixture model to obtain second TOA measurement values represented by the Gaussian mixture model, comprises:

modeling the probability density of respective first TOA measurement values into a Gaussian mixture model by the following formula to obtain second TOA measurement values $p(R_{\tau_n})$:

$$p(R_{\tau_n}) = \sum_{i=1}^{k} \frac{\alpha_i}{\sigma_i \sqrt{2\pi}} \left[ \frac{-1}{2\sigma_i^2}(R_{\tau_n} - \mu_i)^2 \right] = \sum_{i=1}^{k} \alpha_i \cdot p(R_{\tau_n} | \mu_i, \sigma_i^2),$$

$$R_{\tau_n} \in \{R_{\tau_1}, R_{\tau_2}, \ldots, R_{\tau_N}\},$$

where $R_{\tau_n}$ is the first TOA measurement values between the user a and the base station i obtained by performing the nth measurement; $R_{\tau_n} = r_{a,Toa,n}{}^i = r_{a,Ture,n}{}^i + r_{Bias} + w_a{}^i$, where $r_{a,Ture,n}{}^i$ is the true TOA value between the user a and the base station i obtained by performing the nth measurement, $r_{Bias}$ is an additive bias greater than zero, and $w_a{}^i$ a is measurement errors of the first TOA measurement values; n is number of measurements, n≤N; k is a number of change of channel that the value of $r_{Bias}$ varies with the change of channel; $\mu_i$ is a mean value of the first TOA measurement values corresponding to the base station i; $\sigma_i$ is a standard deviation of the first TOA measurement values corresponding to the base station i; $\alpha_i$ is an amplitude corresponding to the Gaussian distribution of the first TOA measurement values of the base station i, $$\sum_{i=1}^{k} \alpha_i = 1, 0 < \alpha_i < 1; p(R_{\tau_n} | \mu_i, \sigma_i^2)$$

represents the probability density of $R_{\tau_n} | \mu_i, \sigma_i^2$.

12. The terminal of claim 10, wherein selecting the TOA measurement values modeled into the Gaussian mixture model, comprises:

obtaining, among the second TOA measurement values, TOA measurement values with the smallest mean value as third TOA measurement values.

13. The terminal of claim 12, wherein the obtaining, among the second TOA measurement values, TOA measurement values with the smallest mean value as third TOA measurement values, comprises:

obtaining, among the second TOA measurement values, the TOA measurement values with the smallest mean value, and taking the TOA measurement values with the smallest mean value as the third TOA measurement values between the user and the base station i:

$$z = \arg\min_{j}(\mu_j), j \in 1, 2, \ldots, k,$$

wherein z is a serial number corresponding to the smallest mean value among the mean values $\mu_1, \mu_2, \ldots \mu_k$, of respective second TOA measurement values; $\mu_z$ is the mean value corresponding to a Gaussian distribution with the smallest mean value among the Gaussian mixture distribution; j is the number when performing traversal the number of change of channel.

14. The terminal of claim 13, wherein the performing NLOS identification on selected TOA measurement values to obtain an identification label, comprises:

performing the NLOS identification on the third TOA measurement values according to a standard deviation-based NLOS identification method or a skewness and kurtosis-based NLOS identification method to obtain fourth TOA measurement values and a corresponding identification label; and wherein the correcting the selected TOA measurement values according to the identification label, comprises:

eliminating TOA measurement values with a largest NLOS error among the fourth TOA measurement values according to a leave-one-out method or a gradient descent method to obtain a fifth TOA measurement values;

performing traversal correction processing on corresponding fifth TOA measurement values according to each identification label to obtain corrected sixth TOA measurement values.

15. The terminal of claim 14, wherein after correcting the selected TOA measurement values according to the identification label, the program, when executed by the processor, causes the processor to further implement the following steps:

calculating user location results according to the corrected sixth TOA measurement values, a user positioning algorithm and a predefined criterion, and positioning the terminal according to the user location result;

wherein the predefined criterion comprises selecting the user location with a smallest distance residual.

16. The terminal of claim 9, wherein before the modeling the probability density of first TOA measurement values from each base station to the terminal into the Gaussian mixture model, and selecting the TOA measurement values modeled into the Gaussian mixture model, the program, when executed by the processor, causes the processor to further implement the following steps:

receiving positioning reference signal (PRS) configuration information sent by each base station, and performing downlink PRS measurement according to each PRS configuration information to obtain the TOA measurement values from each base station to the terminal.

17. A non-transitory computer-readable storage medium storing computer programs, which when executed by a processor, implement steps of the method for eliminating non-line of sight (NLOS) errors of time of arrival measurement values of claim 1.

* * * * *